W. & A. J. TOBEY.
ACETYLENE GAS GENERATOR.
APPLICATION FILED APR. 28, 1910.
978,511.
Patented Dec. 13, 1910.
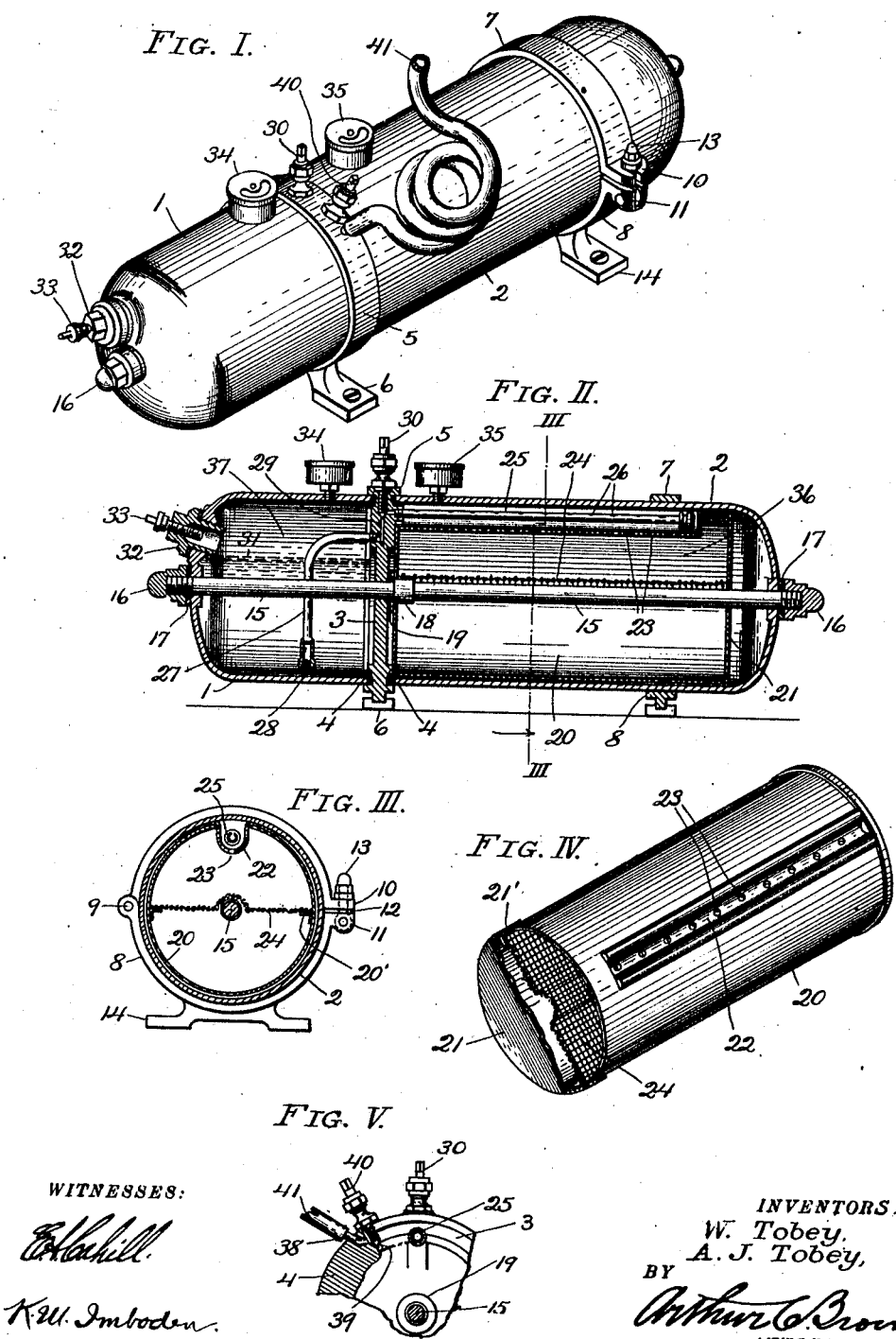
WITNESSES:
INVENTORS.
W. Tobey.
A. J. Tobey,
BY
ATTORNEY.

UNITED STATES PATENT OFFICE.

WILLIAM TOBEY AND ALFRED J. TOBEY, OF IOLA, KANSAS.

ACETYLENE-GAS GENERATOR.

978,511. Specification of Letters Patent. Patented Dec. 13, 1910.

Application filed April 28, 1910. Serial No. 558,143.

*To all whom it may concern:*

Be it known that we, WILLIAM TOBEY and ALFRED J. TOBEY, both citizens of the United States, residing at Iola, in the county of Allen and State of Kansas, have invented certain new and useful Improvements in Acetylene-Gas Generators; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to acetylene gas generators and more particularly to a device especially adapted for supplying gas lamps on automobiles or other vehicles.

The principal objects of our invention are to provide an acetylene gas generator having a large generating capacity in proportion to its size; which will not permit leakage of gas; which will deliver the gas in a comparatively dry condition, and in which the carbid is held out of contact with the outer shell of the apparatus.

A further object of the invention is to provide the improved details of structure hereinafter described and pointed out in the claims, reference being had to the accompanying drawings, in which:—

Figure I is a perspective view of a complete generator embodying our invention. Fig. II is a vertical longitudinal section thereof, indicating the water in the left hand chamber. Fig. III is a cross-section upon the line III—III of Fig. II. Fig. IV is a perspective view of the carbid and ash holder, a part of the removable head being broken away. Fig. V is a detail view, partly in section, of the gas duct between the generating chamber and the hose nipple; the carbid holder being removed.

Referring more in detail to the parts:—

The outer shell of the generator is composed of two container parts, 1 and 2, the open ends of which are fitted against opposite sides of a metallic partition 3 and provided with gaskets 4, for forming tight joints, the periphery of the partition 3 being formed with gasket grooves and with an exterior annular flange 5, having a pair of supporting legs 6.

The shell is made of special steel adapted to resist high internal pressures. Upon the shell member 2, near the end opposite the partition, is a two-part collar, composed of an upper half 7 and a lower half 8, said parts being hinged together at 9 and provided with registering bifurcated lugs 10, 11. Pivoted between lugs 11 is a bolt 12 which is adapted for projection between the parts of the upper lug 10, and has a nut 13 which may be tightened against the lug to hold the parts together. The lower collar member 8 is provided with legs 14, which, with the legs 6, are adapted to support the device on the running-board of an automobile.

Passing through central openings in the shell members 1, 2, and in the partition 4, is a longitudinal bolt 15, having end nuts 16, between which and the shell members are located the soft washers 17, the parts being so arranged that when the nuts 16 are properly tightened the shell sections will be held firmly against the metal partition 3 and the device rendered gas-tight.

On the bolt 15, adjacent the partition 4, is a collar 18, and between this collar and the partition 4 is a compressible washer 19, which forms a gas-tight seal around the bolt 15 to prevent leakage of gas or air through the partition, particularly when the generator portion is removed.

Within the large shell member 2 is a can 20, one head 21, of which is removable and provided with a flange 21' for fitting over the sides of the can body, as shown in Fig. IV, both of said heads having central openings, through which the bolt 15 may pass. In the side of can 20 is a longitudinal opening within which is fixed (preferably by soldering) a trough 22, which trough projects into the can, and has perforations 23 in its bottom. Within the can and resting on brackets 20' is a horizontal grating 24, preferably of wire cloth. Formed in the partition is a duct or passage 29 which affords communication between the tubes 25 and 27, and projecting into said duct is a needle valve 30, for regulating the flow therethrough.

25 designates a water supply tube, one end of which is threaded into the end of duct 29 that opens into the gas chamber, the body of the pipe being extended within the trough 21, and provided with a row of perforations 26.

Located in the air and water chamber, within shell member 1, is a tube 27, the upper end of which is threaded into the end of duct 29 and having its opposite end opening into chamber 37. The lower end of this tube is positioned close to the bottom of the chamber and is provided with a ball check valve 28, which operates as hereinafter stated. Threaded into the shell member 1, above the water line, designated 31, is a nipple 32, and fitted into said nipple is an air valve 33, through which air may be forced into the water chamber to provide the feeding pressure, the valve being adapted for receiving the tube of an ordinary tire pump. In the top of the shell member 1, we provide a gage, 34, for indicating the air pressure in the water chamber, and a similar gage 35 is connected to the top of the shell member 2 for indicating the gas pressure in the generating chamber 36. Connected to the flange 5 is a hose nipple 38, which communicates with the interior of chamber 36 by way of a duct or passage 39 in the metal partition 3, and connected to the nipple 38 is a flexible tube 41 for leading the gas from the generator. Duct 39 is provided with a needle valve 40 for controlling the flow from the generator to the lamp.

The mode of operation is as follows: The generator part 2 of the shell is opened, the can 20 removed from the shell, the head 21 removed from the can, and a charge of carbid placed on the grating 23. The can is then closed and replaced in the shell, and the latter sealed up by means of the bolt 15 and nut 16. The chamber 37 is filled with water through the nipple 32, (after removing the valve 33) up to the water line 31, the valve then being replaced. The rubber tube of an air pump is then connected to said valve, and air is pumped into the chamber 37. When the air pressure has been supplied to chamber 37, the valve 30, which should be closed during the pumping action in order to prevent a rush of water into the tube 25, is opened to allow water to be forced through the tube 27, partition 4, and tube 25 into the trough 22, from which it passes through the perforations 23, and drops upon the carbid, to generate the acetylene gas. When the gas pressure, as shown by the gage 35, approximates that of the air, the valve 30 may be fully opened, as the flow will be even and easily controlled. The compressed air is retained in the chamber 37 by the valve 33, and tends to force water past the check valve 28 and up through the tube 27, to the carbid chamber as long as the air pressure exceeds the gas pressure. As soon, however, as the gas pressure exceeds the air pressure, the check valve 28 will be held closed, and the supply of water will be cut off until sufficient gas has been drawn off through the tube 41 to reduce the pressure of the gas below that of the air.

It will be apparent that the carbid can not be slaked by a sudden rush of water, thereby generating excessive quantities of gas, nor can the gas obtain entrance into the body of water, as the check valve 28 effectually prevents such action. When the carbid has been slaked, it is a simple matter to open the shell having first closed valve 30, remove the can 20 and its head 21 and dump the ash, the receptacle then being ready for a fresh charge of carbid.

Having thus described our invention, what we claim as new therein and desire to secure by Letters-Patent is:—

1. An acetylene gas generator shell comprising an upright partition plate having supporting legs; two cylindrical shell members, gaskets between the shell members and the partition plate, a concentric fastening bolt passing through said plate and the ends of the shell members, a two-part collar embracing one of the shell members, one part of said collar having supporting legs, and fastening means for the two parts of said collar.

2. An acetylene gas generator shell comprising an upright partition plate having supporting legs; two cylindrical shell members, gaskets between the shell members and the partition plate, a concentric fastening bolt passing through said plate and the ends of the shell members, a two-part collar embracing one of the shell members, the parts of said collar being hinged together at one side and provided with a fastener at the opposite side.

3. An acetylene gas generator comprising two outer shell sections, means for securing the same together, a transverse partition between said sections, a carbid can practically filling one of the shell sections, a perforated trough at the top of said can, a grating within the can, a perforated tube within said trough, an air admission valve upon the other shell section, a tube connected with said partition and extending downwardly toward the bottom of the last named shell section, and a check-valve connected to or into said last named tube.

In testimony whereof we affix our signatures in presence of two witnesses.

WILLIAM TOBEY.
ALFRED J. TOBEY.

Witnesses:
C. M. COLE,
W. H. HAMILTON.